(12) United States Patent
Marscholl

(10) Patent No.: US 6,820,370 B2
(45) Date of Patent: Nov. 23, 2004

(54) MOTOR VEHICLE WINDOW LIFT WITH RIGIDLY COUPLED ACTUATORS

(75) Inventor: Klaus Marscholl, Ehringshausen-Breitenbach (DE)

(73) Assignee: Kuster & Co., GmbH, Ehringshausen (DE)

( * ) Notice: Subject to any disclaimer, the term of this patent is extended or adjusted under 35 U.S.C. 154(b) by 0 days.

(21) Appl. No.: 09/401,495

(22) Filed: Sep. 22, 1999

(65) Prior Publication Data

US 2002/0050099 A1 May 2, 2002

(30) Foreign Application Priority Data

Sep. 22, 1998 (DE) .......................................... 198 43 496

(51) Int. Cl.⁷ .............................................. E05F 11/48
(52) U.S. Cl. ........................................ 49/352; 49/502
(58) Field of Search .................... 49/348, 349, 352, 49/372, 502

(56) References Cited

U.S. PATENT DOCUMENTS

| | | | | |
|---|---|---|---|---|
| 4,648,206 A | * | 3/1987 | Moriya et al. ............... | 49/352 |
| 4,669,221 A | * | 6/1987 | Ugawa et al. ............... | 49/352 |
| 4,691,475 A | * | 9/1987 | Maekawa ..................... | 49/352 |
| 4,730,414 A | * | 3/1988 | Nakamura et al. ........... | 49/348 |
| 4,819,377 A | * | 4/1989 | Bauer et al. ................. | 49/221 |
| 4,910,917 A | * | 3/1990 | Brauer ........................ | 49/348 |
| 4,920,697 A | * | 5/1990 | Vail et al. .................... | 49/348 |
| 4,970,827 A | * | 11/1990 | Djordjevic ................... | 49/349 |
| 4,984,386 A | * | 1/1991 | Marscholl et al. ........... | 49/352 |
| 5,067,281 A | * | 11/1991 | Dupy .......................... | 49/502 |
| 5,226,259 A | * | 7/1993 | Yamagata et al. ........... | 49/502 |
| 5,351,443 A | * | 10/1994 | Kimura et al. ............... | 49/502 |
| 5,469,663 A | * | 11/1995 | TenBrink et al. ............ | 49/375 |
| 5,685,111 A | * | 11/1997 | Zimmerer et al. ........... | 49/352 |
| 5,740,630 A | * | 4/1998 | Medebach ................... | 49/352 |
| 6,050,029 A | * | 4/2000 | Simon et al. ................ | 49/352 |
| 6,073,395 A | * | 6/2000 | Fenelon ...................... | 49/358 |

FOREIGN PATENT DOCUMENTS

| | | | |
|---|---|---|---|
| DE | A 1 555 639 | 8/1970 | |
| DE | 2323784 | 11/1974 | |
| DE | 7514676 | 9/1975 | |
| DE | 3615578 C1 | 9/1987 | |
| DE | 3521678 C2 | 10/1990 | |
| DE | 19654851 | * 12/1996 | |
| JP | 642256 | * 2/1994 | ................... 49/352 |

* cited by examiner

Primary Examiner—Gregory J. Strimbu
(74) Attorney, Agent, or Firm—Liniak, Berenato & White

(57) ABSTRACT

A motor-vehicle window lift comprises a mounting structure, a drive system, a cable system having two cable segments running substantially parallel to each other, reversing rollers for the cable system and two window-pane actuators each affixed to a respective one of the cable segments, the actuators are displaceably guided along a respective guide of the mounting structure, wherein the actuators are rigidly connected to each other by a rigid coupling such that the actuators are non-movably fixed to the rigid coupling in a lift operating condition.

6 Claims, 3 Drawing Sheets

MOTOR VEHICLE WINDOW LIFT WITH RIGIDLY COUPLED ACTUATORS

BACKGROUND OF THE INVENTION

1. Field of the Invention

The invention relates to a motor-vehicle window lift comprising a mounting structure, a drive means, a cable system having two cable segments running substantially parallel to each other, reversing rollers for the cable system and two window-pane actuators each affixed to one of the cable segments, at least one actuator being displaceably guided inside a guide at the mounting structure.

2. Description of Related Art

Such a window lift already is known from the German patent document C1 36 15 578 and comprises four stationary reversing rollers enclosed by a sealed cable system. The cable is displaced by a drive means and comprises pane actuators for the pane which are affixed to cable segments running in guides in the direction of pane displacement. In this known window lift, operational reliability shall be increased by the cable system consisting of two mutually separate, closed cable loops, each of which comprises a cable segment running in the direction of pane displacement and both being substantially parallel to each other.

The German patent document C2 35 21 678 discloses a window lift in a vehicle body having an inside wall, this lift comprising a guide plate rigidly joined to the inside wall and having two mutually parallel and opposite end zones. This window lift furthermore includes a displacement system firmly affixed to the window pane and guided up-and-down on the guide plate. The displacement system comprises two runners directly connected to the window pane and each guided on the end zones of the guide plate. A drive unit driving the window pane is mounted on the guide plate. The cable system of this window lift comprises only one vertically moving cable segment fitted with a displaceable support firmly affixed by screw and nut to the window pane. The displaceable support must be connected to the window pane at a point underneath the window-pane's center of gravity.

The German Gebrauchsmuster 75 14 676 discloses vehicle window-lift comprising a carriage supporting the window pane and displaceable along a guide running in the direction of displacement of said pane, a gear rack running next to the guide meshing with a pinion, which is rotatably supported on the guide, engaging the carriage. The guide is constituted by a guide rail consisting of a flat U channel with legs bent outward at their edges and entering slots in slides mounted on the carriage. The guide rail is fitted at its middle longitudinal zone with a longitudinal web aperture which is crossed by a connecting pin implementing the connection between the carriage mounted on the side of the guide rail away from the vehicle inside space and the gear rack over the other broad side of the guide rail. The gear rack is mounted to the connecting pin so as to be tiltable and rotatable about this pin's longitudinal axis.

In general single- and double-strand gear-rack window lifts are known in automotive engineering, which differ essentially in that the single-strand window-lifts are fitted with a single guide rail but the double-strand window lifts are fitted with two guide rails. As regards the double-strand systems, they incur a drawback in that they require substantial labor when installing the window lift in a motor-vehicle door. Another drawback is that the mounting structure is about the size of the door, ie of the window. On the other hand the double-strand window systems offer the advantage of significantly improving pane guidance, that is they grip the pane better than do the single-strand systems. The heretofore known double-strand systems do however entail comparatively large separations between the actuator guides. The comparatively large sizes of conventional double-strand systems limits the space available for the integration of additional devices in the region of the motor-vehicle door. As regards the single-strand systems, they entail the problem that on account of tipping or jamming, pane motion will be uneven.

SUMMARY OF THE INVENTION

The objective of the invention is to so develop apparatus having the initially stated features as to create a window lift offering good pane-guiding properties while being compact.

This task is essentially attained in the invention by a window lift having the initially stated features in that the two actuators, or slides, are interconnected preferably by a rigid coupling.

Accordingly the invention is based on the insight to mount a two-rail window lift on a somewhat enlarged mounting structure of a single-rail window lift, said two-rail window lift being substantially more compact than those of the heretofore known two-rail window lifts. Moreover the window lift of the invention offers exceedingly good guidance properties in the window-pane guide. This feature is attained in that the two actuators, or slides, are interconnected by a preferably rigid coupling. The steps of the invention furthermore reduce the complexity of installation, also the weight of the window lift, and it is feasible to mount additional units or components on the mounting structure inside the motor-vehicle door. In summary, the window lift with the features of the invention offers a combination of the advantages of a single-rail window lift as regards simple design, price, complexity of manufacture and installation, with the advantages of a two-rail window lift regarding even, clamp-free or tip-free pane guidance and high efficacy of gripping. The window lift of the invention is characterized by ergonomic installation and operational reliability. Furthermore it offers an advantageous ratio of pane excursion to separation of guides or actuators or slides, whereby installation space for other window lift components is made available in a motor-vehicle door. The window lift of the invention furthermore offers the advantage that thrust need not be shunted because the cable system always moves in a straight line between the reversal points. Consequently one may dispense with guide spirals acting as the outer sheath of the cable and thereby the efficacy of the window apparatus will be raised. It is possible therefore to use a less powerful drive motor for the window lift, whereby the costs of the window lift of the invention are reduced.

Within the scope of the present invention, the expression 'actuator' on one hand denotes an element which affixes the window pane to the lifting system. On the other hand the term 'actuator' connotes an element in the form of a slide and guided in a window-lift guide. These two functions may be carried out by a single component or also in the form of two, in which case then for instance the actuator is connected for the purpose of affixation with the further slide element. In this instance in particular the actuator and the slide may be adjustable in their relative position.

In a first advantageous embodiment of the invention, the two actuators are integrally joined by a crossbar. Where the slide elements are integrally joined by means of the crossbar, there will also be the possibility to connect the actuators in two parts to the crossbar or the slide and, optionally, in adjustable manner. On account of this design step and despite the small horizontal dimension of the mounting structure between the guide segments for the actuators, or slides, good guidance is assured for the slides and hence for the window pane, and such guidance is extensively free of tipping or jamming torques. The required window-lift rigidity, which directly affects the gripping quality, that is the quality of guidance, is substantially improved by such a design. This preferably rigid coupling moves up-and-down together with the actuators, i.e. with the cable in accordance with the direction of rotation. On account of this connection of the actuators, or slides, window-lift stability is substantially increased.

Another embodiment of the invention makes it possible to constitute the rigid connection in the form of a crossbar which is integrally joined to the slides but is detachably connected to the actuators. Because of this design step, the individual actuator positions of the window lift of the invention can be adjusted, or be matched to compensate for tolerances.

In a further advantageous embodiment of the invention, the width of the mounting structure and/or the separation between the cable segments or the actuators or the slides shall be less than ⅔ the width of the window pane, preferably less than half the width of the window pane. As shown by practical tests, a separation so defined assures an extremely compact window lift with ensuing good window-pane guidance.

In a further and especially preferred and independent embodiment of the invention, the further actuator, ie the further slide is affixed in unguided manner on one cable segment. This design step allows dispensing with a second guide for the second actuator and as a result the apparatus dimension can be further reduced while guidance remains substantially unaltered.

In general however both actuators or slide elements each are preferably displaceably guided in one guide.

In another advantageous embodiment of the invention, the at least one guide may be integrated into the mounting structure. As a result the cost of installation is substantially reduced.

In another advantageous embodiment of the invention, the at least one guide is affixed, for instance by screw means, welding, riveting or the like, as an independently handled component to the mounting structure. Preferably the mounting structure is fitted with sheetmetal supports for the actuators, further braces to support the reversing rollers or the like. Moreover the one or several guides, may be connected to the mounting structure in the end zones of the guide-roller braces.

In a further preferred embodiment, the reversing rollers are mounted at the corner zones of the mounting structure. The cable system is a single cable running in the form of an S over all four reversing rollers, the cable actuators being configured centrally between, or laterally offset from, the center of the reversing rollers. The two actuators connected by a rigid coupling are affixed to the cable system. In this manner tilting, tipping or jamming of the window pane in the body guide will be maximally opposed because parallel and uniform motion of the two actuators or slides is assured.

In yet another preferred embodiment of the invention, the ends of the cable system are anchored by means of adjusting elements to the actuators, or to the slides or the rigid coupling, as a result of which, during installation, the crossbar together with the two actuators can be positioned in comparatively simple manner parallel to the window pane when this pane is situated at the upper stop in the closed position.

Advantageously at least one, preferably both actuators are in the form of horizontally spaced-apart slides, and in particular advantageous manner, the slides are integrally joined to each other by a crossbar.

The window lift of the invention may be installed both inwardly and outwardly, that is, it may be positioned on the dry side as well as on the wet side of the motor-vehicle door. The drive means, whether a handcrank or an electric motor, may be affixed in known manner to the mounting structure.

The window lift of the invention offers another advantage in that the mounting structure, which for instance may be made of plastic, will rigidify the motor-vehicle door and thereby shall act for instance as additional protection against impact.

The described window lift, or the mounting structure, may act as a support for an subassembly's support, for instance for the window-lift drive means, the door grip or the side airbag. Again instead of being made of plastic, the mounting structure may consist of steel sheetmetal or be made of a light metal alloy.

Further purposes, advantages, features and applications of the present invention are elucidated in the following description of illustrative embodiments and in relation to the drawings. All described and/or graphically shown features, whether per se or in arbitrary, meaningful combination, are objects of the present invention, even independently of their summarization in the claims or their dependent claims.

DETAILED DESCRIPTION OF PREFERRED EMBODIMENTS

Figure 1:
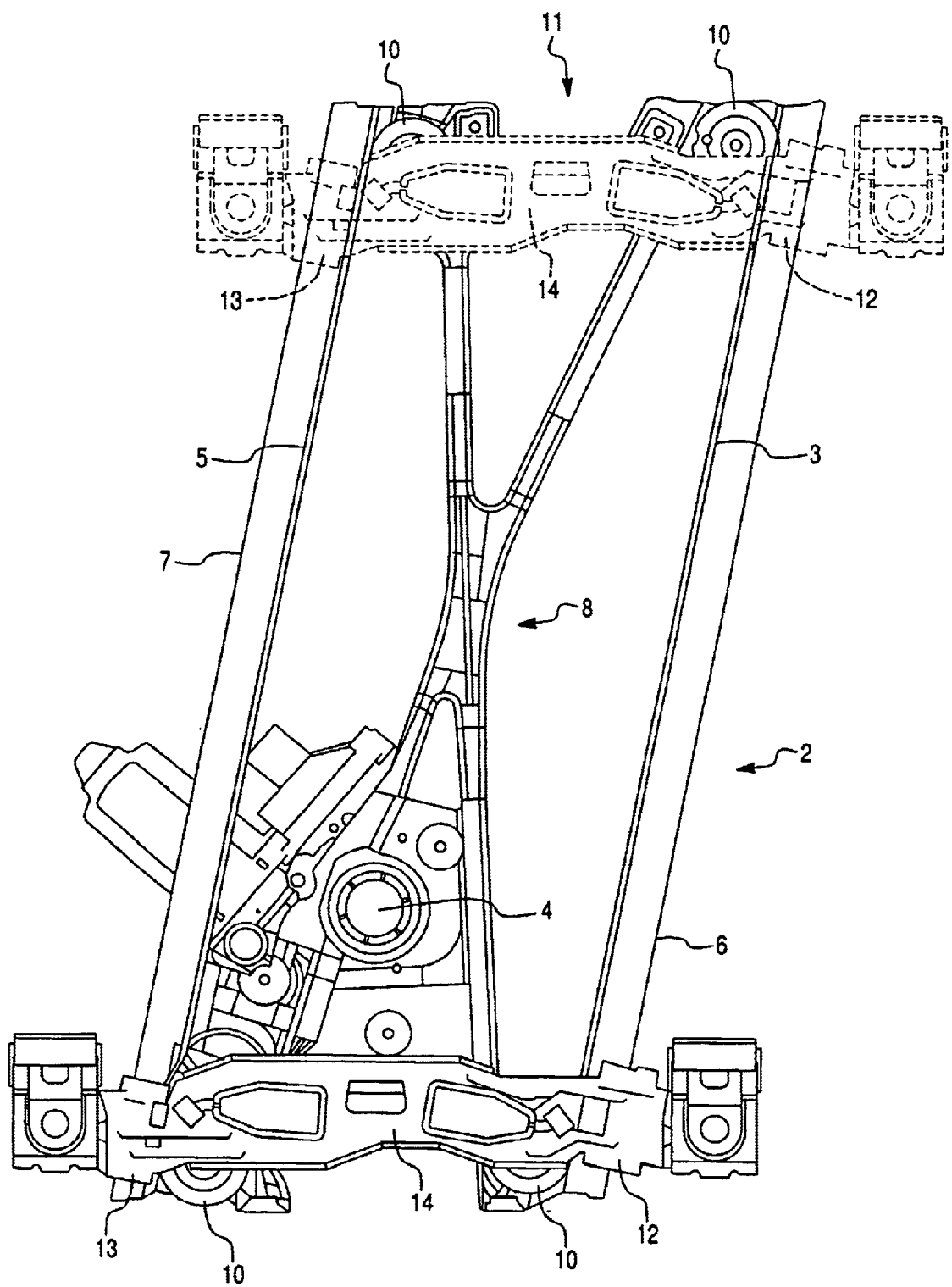
FIG. 1 shows a first embodiment of the window lift of the invention.
Figure 2:
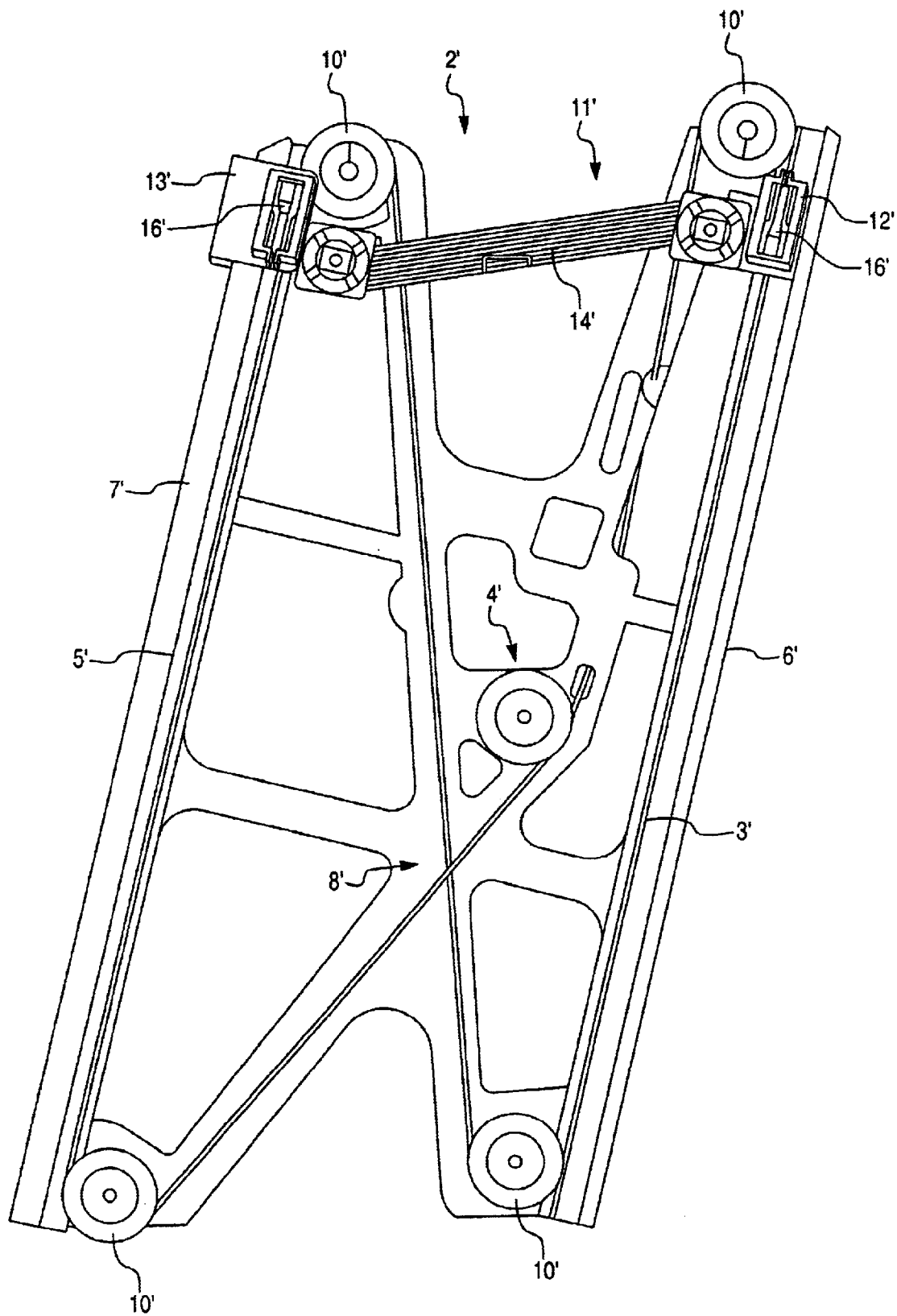
FIG. 2 shows an alternate embodiment with the cable drive means 4 being configured more centrally, slightly laterally offset, relative to the guide 6.

FIG. 1 shows a first embodiment of the window lift of the invention. The mounting structure 2 assumes a substantially rectangular, slightly rhomboid overall shape. Guides 6, 7 are present at both horizontal outer sides and illustratively are guide rails. The width of the mounting structure 2 is selected to be substantially less than that of the door or the width of the window and preferably may be about half the window width or less. A drive means 4 is present at the lower portion of the mounting structure, a drive roller of said drive means being looped by a cable system 8 which is guided over four reversing rollers 10 each configured in an outer corner zone of the mounting structure 2. Substantially mutually parallel cable segments 3, 5 of the cable system 8 run between two approximately vertically superposed and slightly horizontally offset reversing rollers 10. When the drive roller of the drive means 4 is rotating, the cable segments 3, 5 are displaced up or down, according to the direction of rotation of said roller, essentially parallel to the guides 6, 7. As a result the actuators 12, 13, or the slides, being connected to the cable segments 3, 5, also are displaced up or down and thereby the window pane connected to the actuators 12, 13 shall be lowered or raised. The two slides, or the actuators 12 or 13, and hence the cable segments 3, 5, are joined to each other by a rigid coupling 11, for instance a crossbar 14. This rigid coupling 11, i.e. the crossbar 14 mounted between the actuators 12, 13, implements exceedingly high stability of the window lift of the invention, ultimately making possible the reduction in width of the mounting structure 2. Adjusting elements 16, which are shown in more detail in FIG. 2, are present in the crossbar 14 to act on the two cable ends of the cable system 8. The adjusting elements 16 allow adjusting the actuators 12, 13, i.e. the rigid coupling 11, in relation to the cable system 8. It must also be borne in mind that the guides 6, 7 are connected by an interconnecting web having interconnecting legs or braces crossing one another at an acute angle and affixed to the guide end zones. These brackets crossing each other at an acute angle may be in the form of planar parts or the like to affix aggregations of components, for instance, the drive motor.

The embodiment of FIG. 2 is substantially similar to that of FIG. 1, the cable drive means 4' being configured more centrally, slightly laterally offset, relative to the guide 6'. Depending on particular requirements, the cable system also may be guided within a sheath, for instance a flexible tube. The mounting structure 2' of FIG. 2 in addition to two substantially diagonal braces running between the guides 6', 7' also shows two cross-braces mounted substantially orthogonally to the guides 6', 7'. It is understood that the guides 6', 7' may also be connected in known manner in the form of separate elements to the mounting structure. These embodiments of FIGS. 1 and 2 may be modified furthermore in that the mounting structure 2' is fitted only with a single guide 6', 7', the other guide for the corresponding actuator 12', 13', or the slide, being eliminated and this actuator 12', 13' being displaced up-and-down without a guide of its own by means of the rigid coupling 11', ie the crossbar 14', together with the corresponding cable segment 3', 5'.

Figure 3:
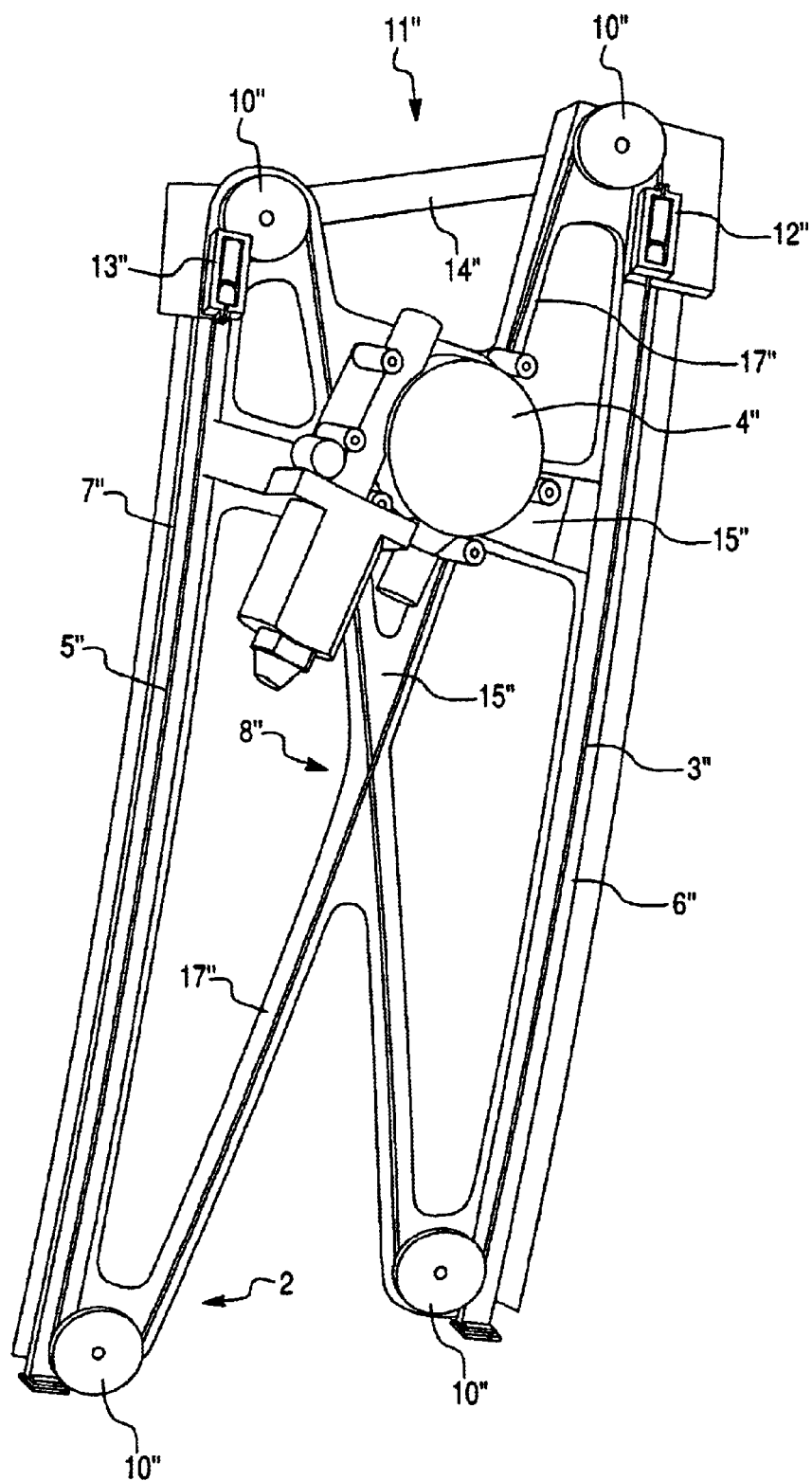
FIG. 3 shows an alternate embodiment with the mounting structure 2" consisting of several parts and illustratively includes a sheetmetal support 15" for the drive means 4", for the braces 17" supporting the reversing rollers 10" and further sheetmetal support for instance to affix one or possibly two guides 6", 7".

With respect to the embodiment of FIG. 3, the mounting structure 2 consists of several parts and illustratively includes sheetmetal supports 15" for the drive means 4", for the braces 17" supporting the reversing rollers 10 and further sheetmetal supports for instance to affix one or possibly two guides 6", 7". Otherwise the design is similar to that of the other embodiments. The embodiment shown in FIG. 3 also makes it easily possible to guide only one of the two actuators 12", 13" in a guide 6", 7" and to affix the other actuator in unguided manner to the corresponding cable segment 3", 5". The elimination of a guide 6", 7" for one of the two actuators 12", 13", or slide elements, however does not entail a significant reduction of the stability, i.e. guidance properties of the window lift of the invention because the two actuators 12", 13", or slide elements, are connected to each other by the rigid coupling 11", i.e. the crossbar 14".

What is claimed is:

1. A motor-vehicle window lift for lifting a window pane from a lower position to an upper position comprising:

a mounting structure (2) comprising an interconnecting continuous web homogeneously formed with two substantially parallel first and second guides (6, 7), a drive system (4) for actuating a lift operating condition, a cable system (8) having two cable segments (3, 5) running substantially parallel to each other, a plurality of several reversing rollers (10) for the cable system (8) and two slides (12, 13) for the window pane, each slide affixed to a respective one of the cable segments (3, 5), said two slides (12, 13) being displaceably guided and slidably fixed respectively directly to said first and second guides (6, 7) on the mounting structure (2), wherein each of said two slides (12, 13) is provided with a slide component respectively guided in said first and second guides, the slide component for each of said two slides being rigidly connected to each other by a rigid coupling such that the slide components are non-movably and non-pivotally fixed to the rigid coupling (11), wherein said interconnecting web includes interconnecting legs interconnecting and homogeneously formed with said guides, each leg having a length greater than a length of a respective one of said guides and at least partly following a path of the cable system (8) substantially along said length.

2. A window lift as claimed in claim 1, wherein the two slides (12, 13) are integrally joined to each other by a crossbar (14) forming said rigid coupling (11).

3. A window lift as claimed in claim 1, wherein the rigid coupling (11) is a crossbar (14) detachably connected to the slides (12, 13).

4. A window lift as claimed in claim 1, wherein the width of the mounting structure (2) is less than approximately ⅔ the width of the window pane.

5. A window lift as claimed in claim 1, wherein a distance between parallel segments of the cable segments (3, 5) is less than approximately ⅔ the width of the window pane.

6. A motor-vehicle window lift for lifting a window pane from a lower position to an upper position comprising:

a mounting structure (2) comprising an interconnecting continuous member homogeneously formed with two substantially parallel first and second guides (6, 7), a drive system (4) for actuating a lift operating condition, a cable system (8) having two cable segments (3, 5) running substantially parallel to each other, a plurality of reversing rollers (10) for the cable system (8) and two slides (12, 13) for the window pane, each slide affixed to a respective one of the cable segments (3, 5), said two slides (12, 13) being displaceably guided and slidably fixed respectively directly to said first and second guides (6, 7) on the mounting structure (2), wherein the two slides (12, 13) are each provided with a slide component respectively guided in said first and second guides (6, 7), the slide components being rigidly connected to each other by a rigid coupling (11) such that the slide components are non-movably and non-pivotally fixed to the rigid coupling, and the window pane is adapted to be connected to the slides (12, 13), wherein said interconnecting member includes interconnecting legs interconnecting and homogenously formed with said guides, each leg having a length greater than a length of a respective one of said guides and at least partly extending along a path of the cable system (8) substantially along said length.

* * * * *